United States Patent
Kim et al.

(10) Patent No.: US 12,422,835 B2
(45) Date of Patent: Sep. 23, 2025

(54) METHOD OF DIAGNOSING GIS (GAS INSULATED SWITCHGEAR) FAILURE AND APPARATUS FOR PERFORMING METHOD

(71) Applicant: ONEPREDICT CO., LTD., Seoul (KR)

(72) Inventors: Soo Ho Kim, Seoul (KR); Ki Bum Park, Seoul (KR); Bo Seong Seo, Seoul (KR)

(73) Assignee: ONEPREDICT CO., LTD., Seoul (KR)

( * ) Notice: Subject to any disclaimer, the term of this patent is extended or adjusted under 35 U.S.C. 154(b) by 366 days.

(21) Appl. No.: 18/004,461

(22) PCT Filed: Feb. 23, 2021

(86) PCT No.: PCT/KR2021/002238
§ 371 (c)(1),
(2) Date: Jan. 6, 2023

(87) PCT Pub. No.: WO2022/019428
PCT Pub. Date: Jan. 27, 2022

(65) Prior Publication Data
US 2023/0251644 A1 Aug. 10, 2023

(30) Foreign Application Priority Data

Jul. 20, 2020 (KR) .................. 10-2020-0089647
Dec. 8, 2020 (KR) .................. 10-2020-0170294

(51) Int. Cl.
*G05B 23/02* (2006.01)

(52) U.S. Cl.
CPC .................. *G05B 23/0221* (2013.01)

(58) Field of Classification Search
CPC .................. G05B 23/0221; G06N 20/00
See application file for complete search history.

(56) References Cited

FOREIGN PATENT DOCUMENTS

| CN | 119760565 A | * | 4/2025 | |
|---|---|---|---|---|
| KR | 20050037242 A | | 4/2005 | |
| KR | 20060037165 A | | 5/2006 | |
| KR | 20090027921 A | * | 3/2009 | ............. G06N 20/00 |
| KR | 20100002964 A | | 1/2010 | |
| KR | 101574613 B1 | | 12/2015 | |
| KR | 101574615 B1 | | 12/2015 | |
| KR | 101822829 B1 | * | 1/2018 | ......... G01R 31/1254 |

OTHER PUBLICATIONS

Machine Translation of KR 101822829 B1 (Year: 2018).*
Machine Translation of KR 20090027921 A (Year: 2009).*
Machine Translation of KR 20100002964 A (Year: 2010).*
Machine Translation of KR 20050037242 A (Year: 2005).*
International Search Report of PCT/KR2021/002238, dated Jun. 7, 2021.

* cited by examiner

*Primary Examiner* — Mi'schita' Henson
(74) *Attorney, Agent, or Firm* — Mark T. Vogelbacker; Eckert Seamans Cherin & Mellott, LLC

(57) ABSTRACT

A method of diagnosing GIS (gas insulated switchgear) failure and apparatus for performing method can include classifying, by a noise classification model, a noise signal and a failure signal. The method can also include classifying, by a failure mode classification model, a failure signal type based on the failure signal.

5 Claims, 5 Drawing Sheets

METHOD OF DIAGNOSING GIS (GAS INSULATED SWITCHGEAR) FAILURE AND APPARATUS FOR PERFORMING METHOD

CROSS-REFERENCE TO RELATED APPLICATION

This application is a National Phase of International Application Number PCT/KR2021/002238, filed Feb. 23, 2021, which claims priority to and the benefit of Korean Patent Application Numbers 10-2020-0089647, filed on Jul. 20, 2020, and 10-2020-0170294, filed Dec. 8, 2020, the disclosures of which are incorporated herein by reference in their entireties.

TECHNICAL FIELD

The present invention relates to a method of diagnosing gas insulated switchgear (GIS) failure and an apparatus for performing the same. More specifically, the present invention relates to a method of diagnosing GIS failure for increasing the accuracy of the diagnosis of the GIS failure based on a trained artificial intelligence model for diagnosing failure of a plurality of GISs, and an apparatus for performing the same.

BACKGROUND ART

With increases in power consumption, buildings in major populated areas have been gradually becoming more diverse, high-rise and high-tech. As a result, changes in shapes of power equipment, such as reduction of an installation space and encapsulation using a container, have occurred, and active development and dissemination of preventive diagnostic technology for preventing failure of such power equipment is required. However, due to the insufficient use of technology for proper preventive maintenance of power equipment and the increases in power consumption, factors causing disasters such as damage to power equipment and damage to human life and property are increasing.

Among many types of current power equipment, power equipment like a GIS needs to be stably operated in order to increase the reliability of a power system. However, a specific method of preventive diagnosis and operation of a GIS among domestic power equipment is insufficient.

Therefore, there is a need for research on diagnosis technology for more accurately diagnosing GIS failure.

DISCLOSURE

Technical Problem

An object of the present invention is to solve all of the above problems.

In addition, an object of the present invention is to accurately diagnose gas insulated switchgear (GIS) failure based on a plurality of models.

In addition, an object of the present invention is to improve the reliability of a power system by accurately diagnosing GIS failure based on a plurality of models generated by different learning methods.

Technical Solution

A representative configuration of the present invention for achieving the above objects is as follows.

According to an aspect of the present invention, there is provided a method of diagnosing gas insulated switchgear (GIS) failure, comprises classifying, by a noise classification model, a noise signal and a failure signal and classifying, by a failure mode classification model, a failure signal type based on the failure signal.

Meanwhile, wherein the noise classification model is generated by machine-learning only the failure signal without assigning a separate class to the noise signal.

Further, wherein the failure signal type is one of corona, floating, particle, and void.

According to another aspect of the present invention, there is provided an apparatus for diagnosing gas insulated switchgear (GIS) failure comprises a noise classification model implemented to classify a noise signal and a failure signal and a failure mode classification model implemented to classify a failure signal type based on the failure signal.

Meanwhile, wherein the noise classification model is generated by machine-learning only the failure signal without assigning a separate class to the noise signal.

Further, wherein the failure signal type is one of corona, floating, particle, and void.

Advantageous Effects

According to the present invention, an object of the present invention is to accurately diagnose gas insulated switchgear (GIS) failure based on a plurality of models.

In addition, an object of the present invention is to improve the reliability of a power system by accurately diagnosing GIS failure based on a plurality of models generated by different learning methods.

MODES OF THE INVENTION

Figure 1:
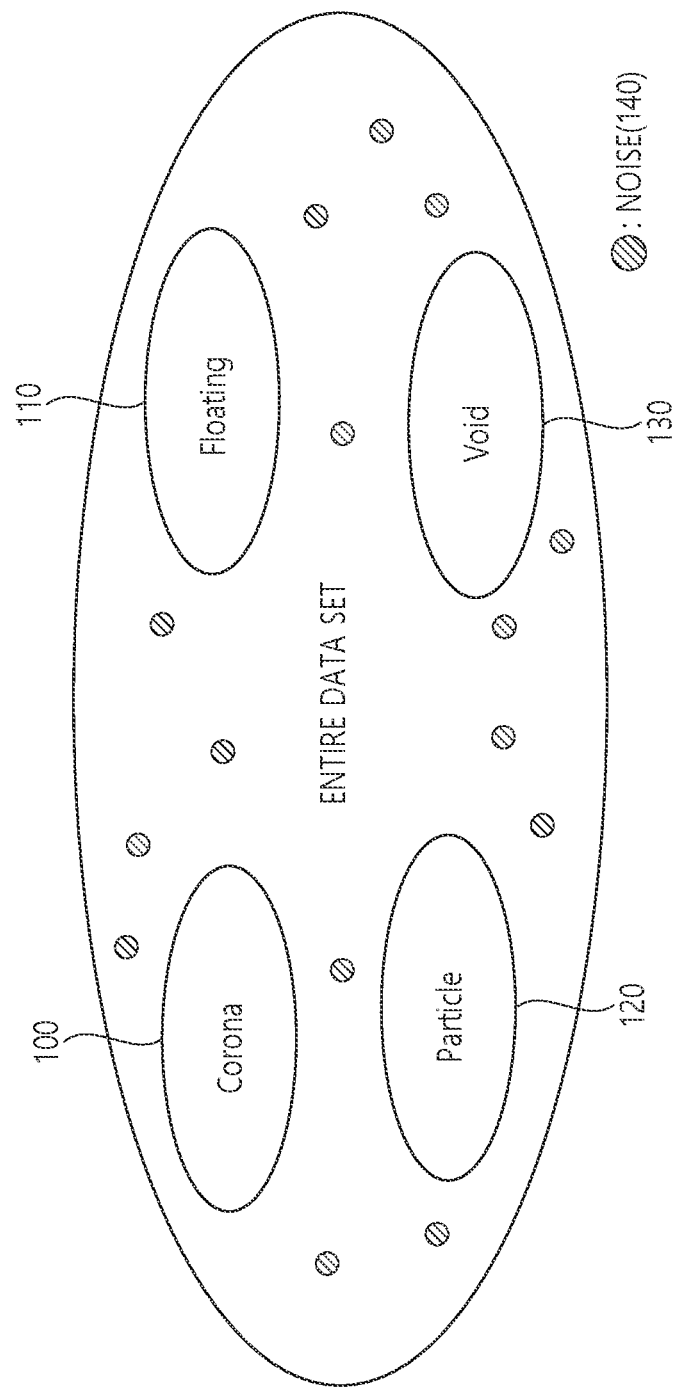
FIG. 1 is a conceptual diagram illustrating causes of a partial discharge (PD) of a gas insulated switchgear (GIS).

The detailed description of the present invention will be made with reference to the accompanying drawings showing examples of specific embodiments of the present invention. These embodiments will be described in detail such that the present invention can be performed by those skilled in the art. It should be understood that various embodiments of the present invention are different but are not necessarily mutually exclusive. For example, a specific shape, structure, and characteristic of an embodiment described herein may be implemented in another embodiment without departing from the scope and spirit of the present invention. In addition, it should be understood that a position or arrangement of each component in each disclosed embodiment may be changed without departing from the scope and spirit of the present invention. Accordingly, there is no intent to limit the present invention to the detailed description to be described below. The scope of the present invention is defined by the appended claims and encompasses all equivalents that fall within the scope of the appended claims. Like reference numerals refer to the same or like elements throughout the description of the figures.

Hereinafter, in order to enable those skilled in the art to practice the present invention, exemplary embodiments of the present invention will be described in detail with reference to the accompanying drawings.

FIG. 1 is a conceptual diagram illustrating causes of a partial discharge (PD) of a gas insulated switchgear (GIS).

Referring to FIG. 1, GISs have been widely applied because they can be made compact by encapsulating $SF_6$ gas having excellent insulation performance, and have excellent stability, environmental compatibility, and the like. A GIS is a highly reliable device which is not affected by the atmosphere because of a closed structure in which a high voltage part is encapsulated in a metal container, and has few failure factors because of a simple structure.

However, since the inside of a GIS is not visible, it is difficult to detect anomalies occurring inside the GIS. When a failure such as insulation breakdown occurs, there is a problem in that a ripple effect of the accident is large, and it takes a long time to recover from the accident, resulting in a very long power outage.

Most GIS accidents are due to the presence of metallic particles, incomplete contact of conductors, defects in spacers, and insufficient quality management during assembly and installation, and foreign substances due to mechanical wear may occur during the GIS operation.

In particular, since the PD in the GIS has a possibility of easily resulting in total breakdown, the problem of PD in gas insulation is very important. The PD is a localized discharge phenomenon that occurs at places other than places between electrodes, and is a phenomenon that degrades the insulation performance of the inside of the GIS and leads to internal failure. A type of the PD of the GIS may be classified into corona 100, floating 110, particle 120, or void 130.

1) Corona 100

The corona 100 is a discharge that occurs at a ground or at a point of a conductor (e.g., a metal protrusion), in which stress is applied to a tip of the protrusion, and the corona 100 may be generated at a peak voltage. The corona 100 may be generated when a protrusion is formed on a conductor and an enclosure inside the GIS or when particles are attached to the conductor and the enclosure.

2) Floating 110

The floating 110 is a discharge between metal bodies when electrical connection with a ground or a conductor is incomplete, in which the surrounding voltage may increase until a connection part is partially discharged. The floating 110 may be a capacitive discharge generated from a floating electrode or a floating portion where the GIS is not grounded or is not electrically connected to a bus bar.

3) Particle 120

The particle 120 is a discharge that is generated at the moment of return of electric charges after internal foreign substances move to other locations by obtaining electric charges from the grounded GIS enclosure under the influence of a strong electric field. The particle 120 may be generated when conductive foreign substances are introduced into a GIS.

4) Void 130

The void 130 is a discharge generated by voids or surface contamination of an insulator, and high and low amplitudes may appear at the same time. The void 130 is a representative PD that may occur in an insulator, and may be generated in a form such as voids in a dielectric of a GIS conductor or surface contamination of a GIS barrier.

A signal generated from the GIS includes not only signals due to the corona 100, the floating 120, the particles 130, and the voids 140, but also a noise signal 140.

The noise signal 140 is a signal detected by a sensor, such as a partial discharge signal, and may reduce the accuracy of the failure determination of the GIS.

Therefore, in a method of diagnosing GIS failure and an apparatus for performing the method according to an embodiment of the present invention, a method of distinguishing a failure signal (or a PD signal) (a signal for the corona 100, a signal for the floating 110, a signal for the particle 120, and a signal for the void 130) and a noise signal 140 and more accurately performing diagnosis of GIS failure is disclosed.

Figure 2:
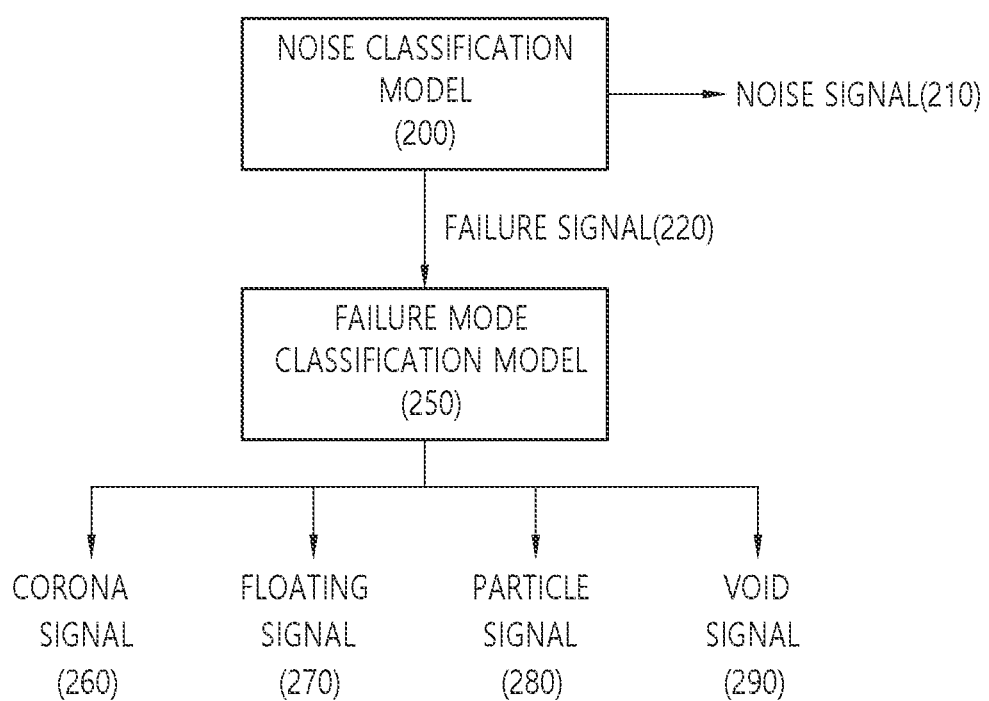
FIG. 2 is a conceptual diagram illustrating a method of diagnosing GIS failure according to an embodiment of the present invention.

FIG. 2 is a conceptual diagram illustrating a method of diagnosing GIS failure according to an embodiment of the present invention.

A method of performing diagnosis of GIS failure based on two failure diagnosis models is disclosed with reference to FIG. 2.

Referring to FIG. 2, a GIS failure diagnosis model may include a noise classification model 200 and a failure mode classification model 250.

The noise classification model 200 may be a model for classifying the noise signal 210 and the failure signal (a corona signal, a floating signal, a particle signal, or a void signal) 220. In the present invention, the noise classification model 220 may be used as a model for primarily excluding the noise signal 210. A method of training a noise classification model 200 will be described in detail below.

The failure mode classification model 250 may be a model for classifying the failure signal 220. The failure mode classification model 250 may primarily classify the failure signal 220 excluding the noise signal 210 to determine to which of a corona signal 260, a floating signal 270, a particle signal 280, and a void signal 290 the failure signal corresponds, thereby determining the partial discharge type.

Specifically, the failure mode classification model 250 is based on a convolutional neural network (CNN) that has a PD image as an input, and classification classes are corona, particle, floating, and void. A detailed method of training a failure mode classification model 250 is described below. The method of training a failure mode classification model 250 is exemplary, and various types of training methods may be used.

1) Initialize a weight of a network. Standard Gaussian sampling (mean 0, variance 1) is used for initialization.

2) Sample 32 pieces of data from a training set of PD data (Batch Sampling). In this case, in order to minimize the problem of imbalance dataset for each data mode, 8 batches are sampled from each classification class to sample a total of 32 batches.

3) Perform noise removal preprocessing on the sampled data. In the noise removal preprocessing, a 9×9 leaf filter is applied, and when the number of zeros is 40 or more in the 9×9 region, a noise component is removed by replacing all data with zero.

4) Smooth an image by applying a moving average filter to the sampled data.

5) Input the sampled data to the network to generate an output value, calculate a slope of each weight, and back-propagate the calculated slope to update the weight.

6) Repeat operations 2) to 5).

Hereinafter, the noise classification model 200 will be disclosed in detail.

Figure 3:
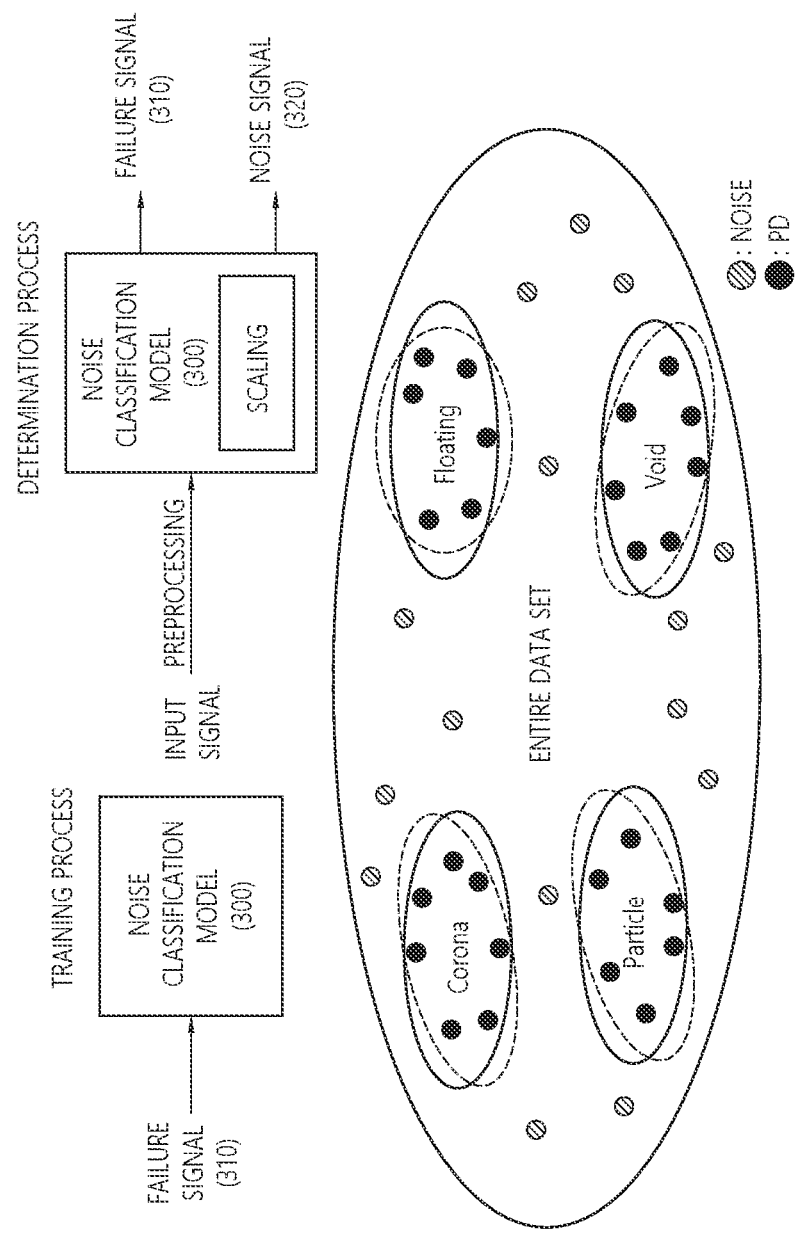
FIG. 3 is a conceptual diagram illustrating a noise classification model according to an embodiment of the present invention.

FIG. 3 is a conceptual diagram illustrating a noise classification model according to an embodiment of the present invention.

A specific method of generating a noise classification model is disclosed with reference to FIG. 3.

Referring to FIG. 3, the noise classification model according to the embodiment of the present invention does not classify the noise signals for learning, but classifies the failure signals for learning instead of the noise signals.

That is, neural network-based learning may be performed only on the failure signal to train the weight for the failure signal, and all signals other than the failure signal may be classified as noise signals based on the training. When such a learning method is used, a model more robust to noise is generated than with a method of assigning a separate class to a noise signal for learning, and therefore the noise filtering performance of the noise classification model may be improved.

The signals input from the GIS include not only the failure signals but also the noise signals (e.g., signals generated from the outside such as an airplane, the ground, a bushing, or a mobile phone). Since the noise signals are generated by various causes, it is difficult to extract common characteristics of the noise signals. Therefore, in the noise classification model according to the embodiment of the present invention, the identification accuracy of the noise signal is improved by a method of learning only failure signals and considering all signals not identified as the failure signals as noise signals rather than a method of assigning a separate class to noise signals to classify the noise signals.

In addition, the noise classification model according to the embodiment of the present invention may be generated such that the learning is terminated relatively earlier than it is for the failure mode classification model. This is because a neural network of the noise classification model concentrates too much on training data currently used for learning, and thus it is necessary to reduce the possibility (or risk) of the neural network discriminating signals that are not observed during the learning process as noise signals even when the signals are similar to failure signals. That is, by limiting the training time for the noise classification model, the probability of discriminating a failure signal as a noise signal may be reduced. By terminating the training of the noise classification model early in another expression, the problems caused by overfitting can be solved.

In the noise classification model, scaling and input pre-processing may be additionally performed to more accurately classify the failure signal and the noise signal. Scaling and input preprocessing methods will be described below.

Figure 4:
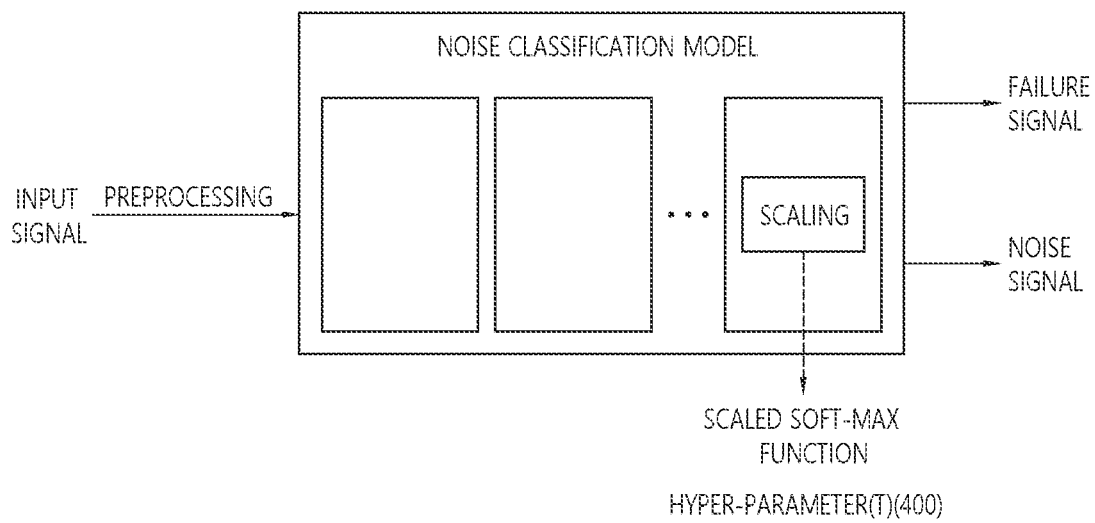
FIG. 4 is a conceptual diagram illustrating the noise classification model according to the embodiment of the present invention.
Figure 4:
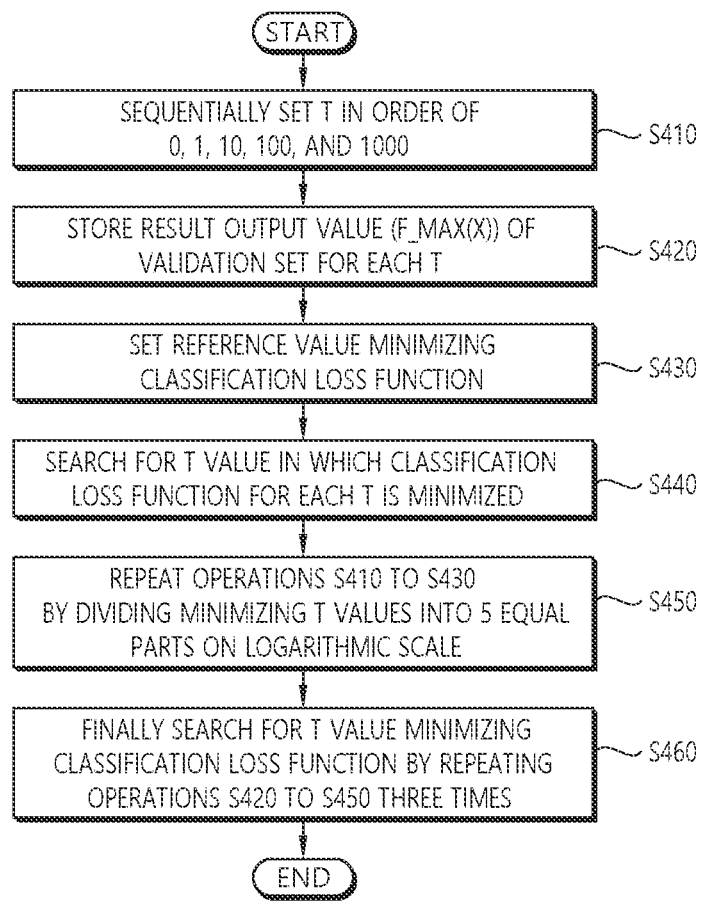

FIG. 4 is a conceptual diagram illustrating the noise classification model according to the embodiment of the present invention.

FIG. 4 discloses a method of performing scaling in a final layer of a noise classification model.

Referring to FIG. 4, a general soft-max function may be used for activation of the final layer of the artificial neural network on the existing noise classification model.

In Equation 1 below, the general soft-max function is disclosed.

$$S(x) = \frac{\exp(f(x))}{\sum_{j=1}^{N} \exp(f(x))} \quad \langle \text{Equation 1} \rangle$$

Because of an exponential function used for the soft-max function, a difference greater than a difference in f(x) occurs. This causes overconfidence in the network. In this case, it is difficult to distinguish between the noise signal and the failure signal.

In the present invention, an appropriate reference value may be set by reducing the difference between the values to which the final soft-max function is applied by applying the following scaling function and adjusting the confidence of the noise classification model.

Equation 2 below may be used in the noise classification model of the present invention as the scaled soft-max function according to an embodiment of the present invention.

$$S(x;T) = \frac{\exp\left(\frac{f(x)}{T}\right)}{\sum_{j=1}^{N} \exp\left(\frac{f(x)}{T}\right)} \quad \langle \text{Equation 2} \rangle$$

In this case, a T value for scaling is a hyper-parameter, and an appropriate value needs to be determined according to the model and data.

Specifically, in the exponential function, when an input value increases, the increase in the output value is significantly larger than the increase in the input value. For example, when there are 4 classification modes, and values for each mode are (x_mode1=1, x_mode2=1, x_mode3=2, and x_mode4=3), f(x) values of each mode are (f(x_mode1)=2.71, f(x_mode2)=2.71, f(x_mode3)=7.39, and f(x_mode4)=20.09), and even if a difference between x_mode1 and x_mode2 is the same as a difference between x_mode3 and x_mode, the difference in the result value is very different. Due to the above phenomenon, an overconfidence phenomenon occurs in which the network shows a much higher difference than the difference of the actual x_mode# for a highest x_mode#.

When a reference value for the confidence level f(x) of the final network is set and a value equal to or less than the set value appears, it is classified as a noise signal. In this case, when the overconfidence occurs as described above, most of the signals at a boundary between the noise signal and the failure signal are close to 0 when input, and only a certain failure signal is close to 1. To set the reference value, it is necessary to find an appropriate boundary value for data very close to 0. Due to the constraints of the computer, since all data very close to 0 is recognized as 0 or is expressed as a number with very weak decimal units, it is difficult to determine the level of the appropriate reference value (boundary value of distribution).

Nevertheless, the exponential function is absolutely necessary for network learning. Therefore, in order to supplement this, in the present invention, the overconfidence may be alleviated by applying the above scaling method.

By alleviating the overconfidence by the scaling method according to the embodiment of the present invention, the output value of the data at the boundary between the failure signal and the noise signal is expressed at an appropriate level (e.g., <0.3) rather than a value very close to 0, and thus the output value may be changed to make it easier to find the boundary value.

A method of determining a hyper-parameter T value for scaling according to an embodiment of the present invention may be performed as follows:

1) Sequentially set T in order of 0, 1, 10, 100, and 1000 (operation S410).
2) Store result output value (f max(x)) of validation set for each T (operation S420).
3) Set reference value minimizing classification loss function (operation S430).
4) Search for T value in which classification loss function for each T is minimized (operation S440).
5) Repeat operations S410 to S430 by dividing minimizing T values into 5 equal parts on logarithmic scale.
6) Finally search for T value minimizing classification loss function by repeating operations 2) to 5) three times.

Equation 3 below is the classification loss function.

$$\text{Classification loss function} = \Sigma((1-x)\log(1-F(x)) + x\log(F(x))). \quad \text{<Equation 3>}$$

F(x): Predicted value that determines whether x is a noise signal or a malfunction signal based on a reference value In case of noise signal: 0, in case of failure signal: 1 x: In case of actual noise signal: 0, in case of actual fault signal: 1

Figure 5:
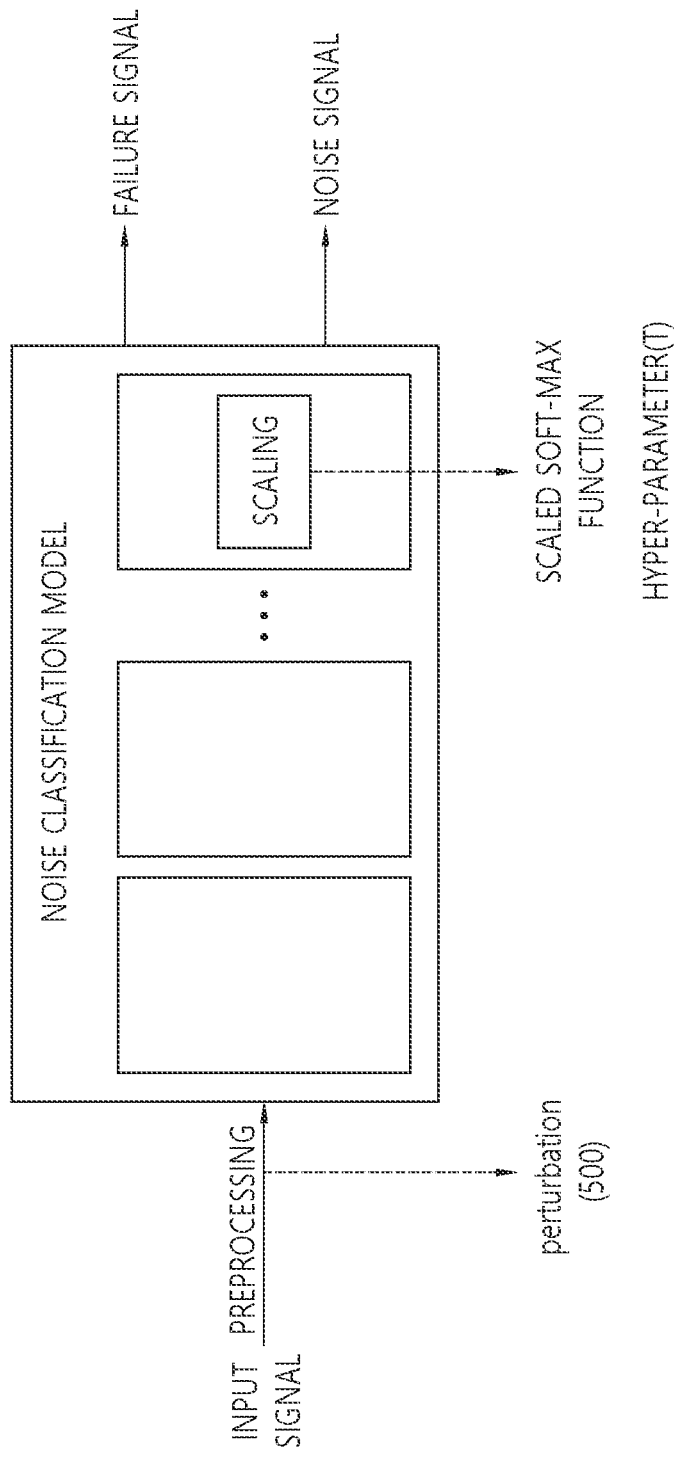
FIG. 5 is a conceptual diagram illustrating the noise classification model according to the embodiment of the present invention.

FIG. 5 is a conceptual diagram illustrating the noise classification model according to the embodiment of the present invention.

A method of preprocessing an input signal in a noise classification model is disclosed with reference to FIG. 5.

Referring to FIG. 5, by subtracting perturbation 500 from the input signal input to the noise classification model, it is possible to increase a soft-max score of the above-described soft-max function for the input value.

The perturbation 500 may be determined based on the already learned network. The input signal is an array of numbers, and the output value of the network for that input can be calculated. When the calculated output value is 0.8, for example, a slope for increasing the calculated output value by 0.01 can be calculated. The slope is represented by the array of numbers of the same size as the input signal, which may be referred to as perturbation 500. The perturbation 500 is variable because the slope varies depending on the input signal, and in order to calculate the perturbation 500, it may be determined by putting the input signal into the learned network to calculate the output and differentiating the output with the input data.

Since the definition of calculating the perturbations 500 is a slope in a direction of increasing the soft-max score, the corresponding score increases when the perturbations 500 are summed. Specifically, when a change is subtracted from the input signal, the soft-max score increases relatively much for the failure signal, and the soft-max score increases relatively little for the noise signal.

When the scaling function described above in FIG. 4 and the input signal preprocessing disclosed in FIG. 5 are performed, the difference between the output values may be small and therefore it is easy to determine the decision value, the failure signal may have relatively high reliability, and the noise signal may have relatively low reliability. As described above, the learning for the noise signal classification model is terminated early to prevent the overfitting to the data used for learning, and therefore the noise signal classification model may be generated by the artificial neural network specialized in detecting noise rather than the failure mode classification model.

The embodiments of the present invention described above may be implemented in the form of program instructions that can be executed through various computer units and recorded on computer readable media. The computer readable media may include program instructions, data files, data structures, or combinations thereof. The program instructions recorded on the computer readable media may be specially designed and prepared for the embodiments of the present invention or may be available instructions well known to those skilled in the field of computer software. Examples of the computer readable media include magnetic media such as a hard disk, a floppy disk, and a magnetic tape, optical media such as a compact disc read only memory (CD-ROM) and a digital video disc (DVD), magneto-optical media such as a floptical disk, and a hardware device, such as a ROM, a RAM, or a flash memory, that is specially made to store and execute the program instructions. Examples of the program instruction include machine code generated by a compiler and high-level language code that can be executed in a computer using an interpreter and the like. The hardware device may be configured as at least one software module in order to perform operations of embodiments of the present invention and vice versa.

While the present invention has been described with reference to specific details such as detailed components, specific embodiments and drawings, these are only examples to facilitate overall understanding of the present invention and the present invention is not limited thereto. It will be understood by those skilled in the art that various modifications and alterations may be made.

Therefore, the spirit and scope of the present invention are defined not by the detailed description of the present invention but by the appended claims, and encompass all modifications and equivalents that fall within the scope of the appended claims.

The invention claimed is:

1. A method of diagnosing gas insulated switchgear (GIS) failure, comprising:
   receiving a signal detected by a sensor of the GIS;
   providing the signal as a classification input to a noise classification model comprising a neural network model operative to classify the classification input as one of a noise signal or a failure signal, wherein the noise classification model:
      is trained using failure signal training data to classify GIS signals as being or as not being the failure signal and to classify all GIS signals determined to not be the failure signal as the noise signal, wherein the failure signal training data does not include signal noise and the classification input is classified without assigning a separate class to noise signals,
      operates using a scaled soft-max function for activation of the final layer of the neural network of the noise classification model, the scaled soft-max function having a hyper-parameter T configured to alleviate overconfidence in the noise classification model, the hyper-parameter T determined based on evaluating a validation set of values and selecting the hyper-parameter T that minimizes a classification loss function, and outputs the failure signal, the failure signal indicating that the GIS is experiencing a type of partial discharge (PD) failure;

providing the failure signal output by the noise classification model as a failure classification input to a failure mode classification model operative to classify the failure classification input as a failure signal type indicating the type of PD failure associated with the signal and to generate a failure type output specifying the failure signal type; and diagnosing the GIS as experiencing the PD failure corresponding with the failure type output, wherein perturbations are removed from the classification input using the noise classification model via putting the classification input into the noise classification model to calculate an output and differentiating the output with the classification input, wherein the perturbations are calculated as a slope in a direction of increasing a soft-max score.

2. The method of claim 1, wherein the failure signal type is one of corona, floating, particle, and void.

3. The method of claim 1, wherein the failure mode classification model is a convolutional neural network (CNN) configured to use a PD image as input, the failure mode classification model trained via:

initializing at least one weight of at least one network, determining sampled data from a set of PD data for each failure signal type, and performing noise removal preprocessing on the sampled data by applying a filter and, responsive to the number of zeros being equal to or greater than 40 zeros in the 9×9 region, removing a noise component by replacing all data with zero.

4. The method of claim 3, wherein training the failure mode classification model further comprises:

smoothing an image by applying a moving average filter to the sampled data, inputting the sampled data to generate an output value and calculating a slope of the at least one weight, and backpropagating the calculated slope to update the at least one weight.

5. The method of claim 1, wherein determining the hyper-parameter T further comprises:

evaluating the validation set of values by sequentially setting the hyper-parameter T to each of the validation set of values, and determining a result output value (f_max(x)) of each value of the hyper-parameter T, setting a reference value minimizing the classification loss function, and searching for the hyper-parameter T value in which the classification loss function is minimized.

* * * * *